3,676,302
LINCOMYCIN PRODUCTION
Jeronimo Visser, Portage, Mich., assignor to The
Upjohn Company, Kalamazoo, Mich.
No Drawing. Filed Aug. 28, 1970, Ser. No. 67,966
Int. Cl. C12d 9/00
U.S. Cl. 195—80 R                3 Claims

ABSTRACT OF THE DISCLOSURE

Microbiological process for preparing the antibiotic lincomycin wherein the concomitant production of lincomycin B (4'-depropyl-4'-ethyllincomycin) is significantly reduced by the addition of an effective amount of propylproline to the fermentation medium. The reduction of lincomycin B in the fermentation beer results in increased lincomycin recovery from the fermentation beer.

BRIEF SUMMARY OF THE INVENTION

Lincomycin is a useful antibiotic produced by a fermentation process using the microorganism *Streptomyces lincolnensis* var. *lincolnensis*. In U.S. Pat. 3,086,912 there is described a fermentation and recovery process for the production of lincomycin, formerly known as lincolnensin. Lincomycin B, a nitrogenous base having the molecular formula $C_{17}H_{32}N_2O_6S$, is concomitantly produced in the lincomycin fermentation. U.S. Pat. 3,359,164 discloses the recovery of lincomycin B from lincomycin fermentations, such as described in U.S. Pat. 3,086,912. Though lincomycin and lincomycin B have activity against essentially the same spectrum of microorganisms, it is known that lincomycin B is significantly less active against said microorganisms than is lincomycin. Accordingly, lincomycin is the preferred antibiotic.

The microbiological process of the subject invention comprises the use of an effective amount of propylproline in a lincomycin fermentation medium, such as disclosed in U.S. Pat. 3,086,912, to reduce the level of lincomycin B present in the fermentation beer. This reduction of lincomycin B in the fermentation beer facilitates the recovery of lincomycin which then leads to higher recovery yields of lincomycin from said beers. A decrease of the lincomycin B content in fermentation beers to 4% or less results in a gain of about 10% of lincomycin in the crystallization step. (The fermentation beers of a controlled fermentation as described in Example 1 of U.S. 3,086,912 will contain approximately 7–9% lincomycin B.)

DETAILED DESCRIPTION

Upon adding an effective amount of propylproline to the fermentation medium of Example 1 in U.S. Pat. 3,086,912, there results a reduction in the fermentation production of lincomycin B, without a reduction in the production of lincomycin.

The effective amount of propylproline which can be added to the lincomycin fermentation can be varied from about 1 mg./l. to about 1,000 mg./l. Higher levels detract from the economic advantages of the process. It has been found that the effective amount of propylproline will vary with media ingredients employed, and that lincomycin synthesis is not detrimentally influenced by levels up to 1,000 mg./l. The propylproline can be added to the fermentation, conveniently, at any time after inoculation, or at intervals during the course of the fermentation. In any event, it is desirable to add the propylproline to the fermentation beer before significant antibiotic production is detected in the fermentation beer.

The preferred propylproline of the subject invention is 4(R)-propyl-L-proline (propylproline). A mixture of 4(R) and 4(S) propylproline can be used if the mixture contains 50% or more of the 4(R) configuration. Though 4(S)-propylproline also reduces the production of lincomycin B, the use of 4(S)-propylproline results in the formation of some cis-lincomycin. The normal configurations of lincomycin is trans.

The lincomycin fermentation of the subject invention can be conducted with variants and/or mutants of the culture deposited and given the repository designation NRRL 2936. This culture also has the deposit designation NCIB 9413, given by the well known culture repository in Scotland.

The propylproline used in the subject invention can be prepared by the procedures disclosed in the Journal of the American Chemical Society, 89:10, May 10, 1967, pp. 2459–2464.

The following example is illustrative of the process of the present invention but is not to be construed as limiting.

Example 1

A soil slant of *Streptomyces lincolnensis* var. *lincolnensis*, NRRL 2936, is used to inoculate a series of 500-ml. Erlenmeyer flasks each containing 100 ml. of seed medium consisting of the following ingredients:

|  | Gms. |
|---|---|
| Yeastolac [1] | 10 |
| Glucose monohydrate | 10 |
| NZ-Amine B [1] | 5 |
| Tap water, q.s., 1 l. | |

[1] Yeastolac is a protein hydrolysate of yeast cells and NZ-Amine B is Sheffield's enzymatic digest of casein.

The seed medium presterilization pH is 7.3. The seed is grown for 2 days at 28° C. on a Gump rotary shaker operating at 250 r.p.m.

A 5% inoculum of the seed described above (5 ml.) is added to each of thirty 500-ml. Erlenmeyer flasks each containing 100 ml. of the following fermentation medium:

|  | Gms. |
|---|---|
| Glucose monohydrate | 20 |
| Molasses | 20 |
| Corn steep liquor | 20 |
| Wilson's peptone liquor No. 159 [1] | 10 |
| Calcium carbonate | 4 |
| Tap water, q.s., 1 l. | |

[1] Wilson's peptone liquor No. 159 is a preparation of enzymatically hydrolyzed proteins from animal origin.

The pH of the medium after sterilization is 7.0. 4(R)-Propyl-L-proline is added to the fermentation flasks after two days of fermentation. The level of propylproline is varied from 1 mg./l. to 1,000 mg./l. The shake flasks are harvested after 4 days of fermentation at 28° C. on a Gump rotary shaker operating at 250 r.p.m. The percent lincomycin B present in the fermentation beers is determined by vapor phase chromatography of the extracted lincomycin complex acording to the procedure disclosed by Houtman et al., J. Pharm. Science, 57(4), 693 (1963). The level of lincomycin B varies from about 6.4% of the total lincomycins, which is essentially the same as a control fermentation without the addition of propylproline, to a level of about 1% lincomycin B when a level of 1,000 mg./l. of propylproline is used. The beer titers of lincomycin are essentially the same over the entire range of propyl-L-proline additions. The level of lincomycin B in the fermentation beer is drastically reduced using the range of 10 to 30 mg./l. propylproline. Thus, this range would appear to be the most efficient range to decrease the level of lincomycin B.

Comparable results to those obtained in this example can be achieved by substituting *S. lincolnensis* var. *lincolnensis*, NCIB 9413 for the NRRL 2936 culture.

What is claimed is:

1. A microbiological process for preparing the antibiotic lincomycin, wherein the concomitant production of lincomycin B is reduced, which comprises adding an effective amount, to inhibit lincomycin B production, of 4(R)-propylproline to a lincomycin fermentation using the microorganism *Streptomyces lincolnensis* var. *lincolnensis*.

2. A process according to claim 1, wherein the effective amount of 4(R)-propylproline is in a range of about 1 to 1,000 mg./l.

3. A process, according to claim 1, wherein the 4(R)-propylproline is in a mixture with 4(S)-propylproline and the 4(R)-propylproline constitutes at least 50% of said mixture.

References Cited

UNITED STATES PATENTS 3,086,912    4/1963    Bergy et al. _____ 195—80 RX

OTHER REFERENCES

Margerlein et al., Lincomycin V Amino Acid Fragment, J.A.C.S., 89:10, May 10, 1967, pp. 2459–2464.

JOSEPH M. GOLIAN, Primary Examiner